United States Patent

Regensburger

[11] Patent Number: 6,054,701
[45] Date of Patent: Apr. 25, 2000

[54] TARGET ACQUISITION APPARATUS

[75] Inventor: Martin Regensburger, Neumarkt, Germany

[73] Assignee: Diehl Stiftung & Co., Nürnberg, Germany

[21] Appl. No.: 09/079,554

[22] Filed: May 15, 1998

[30] Foreign Application Priority Data

May 17, 1997 [DE] Germany .......................... 197 20 832

[51] Int. Cl.[7] .............................. G01C 21/02; G01J 1/42
[52] U.S. Cl. ................................. 250/203.1; 250/206.1; 250/208.2
[58] Field of Search .............................. 250/203.1, 203.2, 250/206.1, 234, 208.2

[56] References Cited

U.S. PATENT DOCUMENTS

| | | |
|---|---|---|
| 3,657,547 | 4/1972 | Mansfield . |
| 4,112,294 | 9/1978 | Pressiat . |
| 4,713,533 | 12/1987 | Bremer et al. . |
| 5,381,236 | 1/1995 | Morgan . |
| 5,600,434 | 2/1997 | Warm et al. . |

FOREIGN PATENT DOCUMENTS

| | | |
|---|---|---|
| 0367407 | 5/1990 | European Pat. Off. . |
| 9417451 | 7/1995 | Germany . |
| 04013990 | 1/1992 | Japan . |

Primary Examiner—Edward P. Westin
Assistant Examiner—Glenn T Kinnear
Attorney, Agent, or Firm—Scully, Scott Murphy & Presser

[57] ABSTRACT

A target acquisition apparatus (10) having a laser beam source (12), wherein associated with the laser beam source (12) is an opto-mechanical tracking device (14) having a receiver (38) for reception of the laser beam which is reflected by a target (28). For evaluation of the signals of the receiver (38) there is provided an electronic evaluation device (18) which is connected together with the opto-mechanical tracking device (14). The receiver (38) has a photovoltaic four-quadrant detector (36) by which two orthogonal spatial direction co-ordinates (X, Y) are established. In order to compensate for dissimilar performance on the part of the quadrant detectors (E1, E2, E3, E4) of the four-quadrant detector (36) as is not to be ruled out for example due to temperature-induced or ageing-induced drift, the electronic evaluation device (18) is provided with switches (S1, S2, S3, S4) for signal inversion purposes.

7 Claims, 1 Drawing Sheet

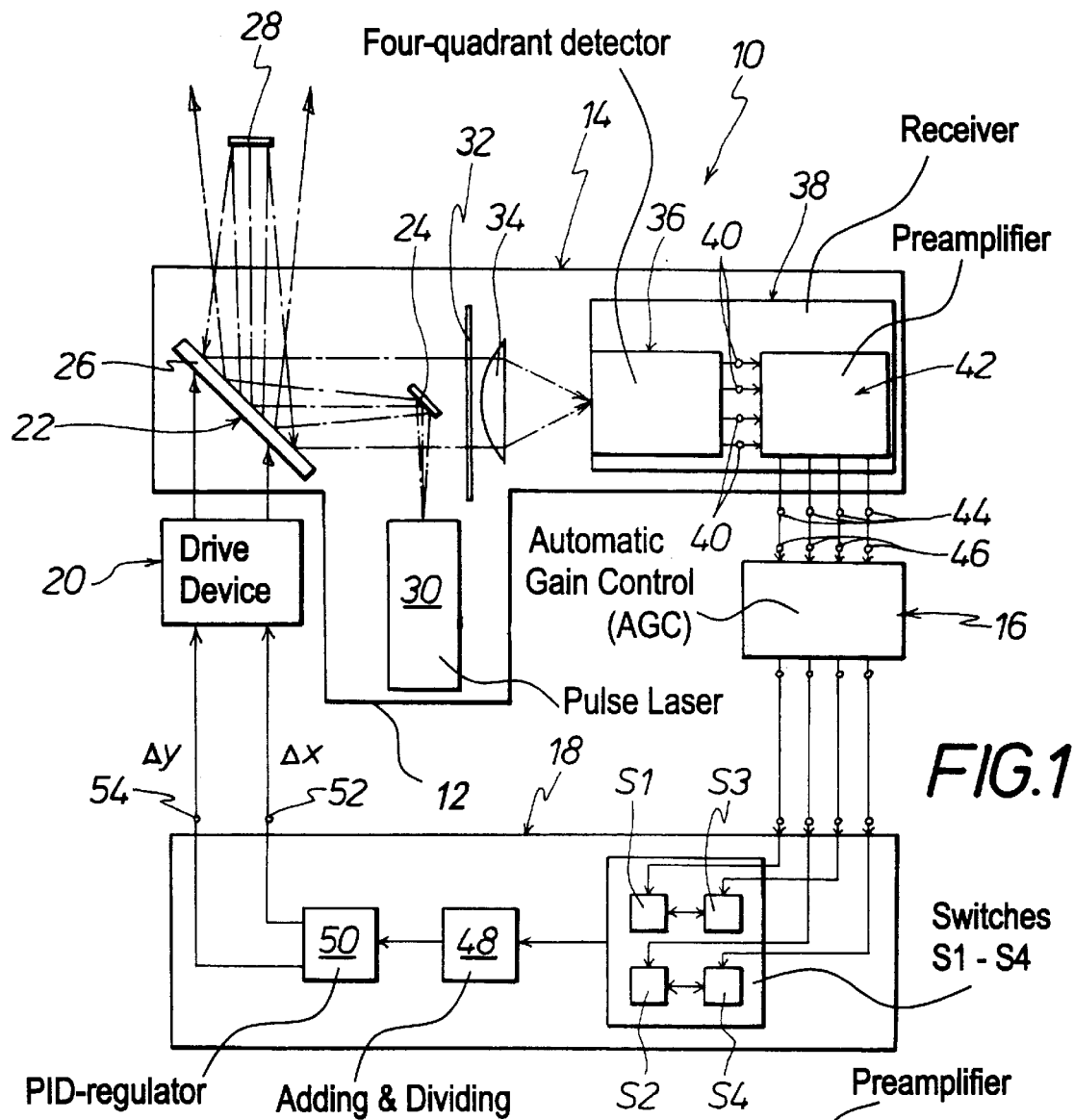
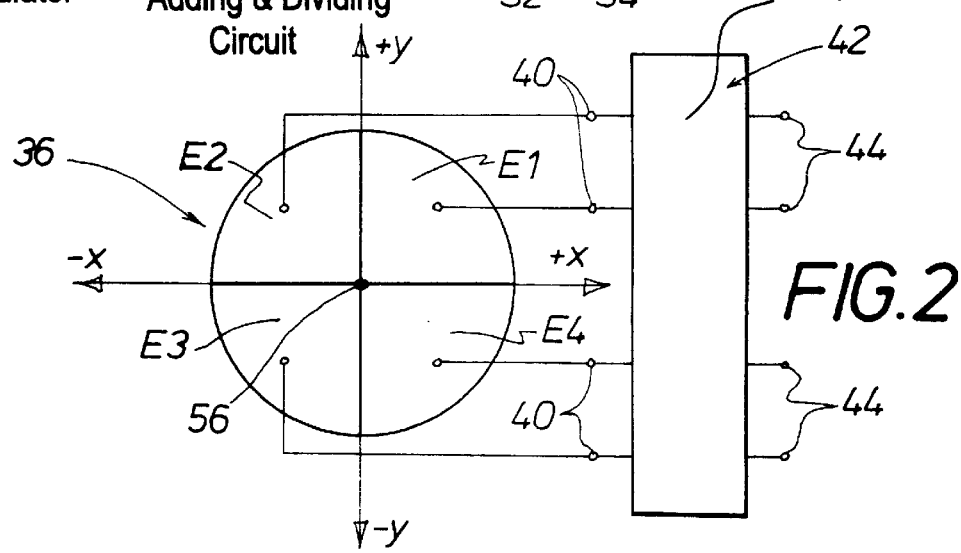

TARGET ACQUISITION APPARATUS

BACKGROUND OF THE INVENTION

1. Field of the Invention

The invention concerns a target acquisition apparatus in the classifying portion of claim 1 having a laser beam source, an opto-mechanical tracking device associated with the laser beam source and including a receiver for receiving the laser which is reflected by the target, and an electronic evaluation device which is provided for evaluation for the signals of the receiver and which is operatively connected with the opto-mechanical tracking device.

2. Discussion of the Prior Art

DE 32 30 068 C2 discloses a process for precise positioning of a beam of a laser transmitter, which is directed on to a location of a target object, wherein both the angular position of the laser radiation reflected by the target object and also the angular position of ht thermal radiation which is emitted by the location on the target object which is hit and heated by the laser beam and measured and a comparison of those two angular positions produces a deviation angle which provides for tracking control of the laser transmitter and thus keeps the laser beam directed on to the heated location on the target object. With that known process it is therefore necessary for the laser transmitter to have a sufficient energy level to heat said location on the target object. In addition that process can only be implemented with a corresponding time delay which results from the fact that the laser beam impinging on the target object requires a certain period of time to heat up the location of impingement on the target object.

The applicants' De 44 02 44 02 855 C2 discloses an apparatus for repelling an air target missile with an IR-search head for attacking an aircraft, wherein the aircraft is equipped with a laser beam source whose laser beam can be directed against the attacking air target missile by way of a follower device of a target tracking system. The laser beam of that known apparatus operates in a frequency band which is in the region of the detection frequency of IR-search heads and it is cyclically operated at a frequency which corresponds to the usual radical frequency of IR-search heads.

SUMMARY OF THE INVENTION

The object of the present invention is to provide a target acquisition apparatus of the kind set forth in the opening part of this specification, in which the giant tracker is improved, with optimum reliability of ht electronic arrangement, in comparison with known giant trackers.

In accordance with the invention, in a target acquisition apparatus of the kind set forth in the opening part of this specification that the object is attained characterizing portion of claim 1 in that the receiver possesses a photovoltaic four-quadrant detector by means of which there are established two orthogonal spatial direction co-ordinates, and the electronic evaluation device is equipped with switches for signal inversion, wherein the signals of the detectors of the second and fourth quadrants are suitably inverted. Preferred configurations and developments of the target acquisition apparatus are characterized in the appendant claims.

The advantages achieved with the target acquisition apparatus according to the invention are that the giant tracker is improved, the reliability of the electronic arrangement is comparatively high, and the requirements in terms of the components and constituent parts of expenditure for adjustment of the electronic arrangement are relatively low.

BRIEF DESCRIPTION OF THE DRAWINGS

Further details, features and advantages will be apparent from the following description of an embodiment, diagrammatically illustrated in the drawing, of the target acquisition apparatus according to the invention, that is to say the giant tracker according to the invention. In the drawing:

FIG. 1 is a schematic block diagram of an embodiment of the target acquisition apparatus, and FIG. 2 is a diagrammatic view of the four-quadrant detector used in the tar get acquisition apparatus illustrated in FIG. 1, with the pre-amplifier connected on the output side of the detector.

DETAILED DESCRIPTION OF A PREFERRED EMBODIMENT

FIG. 1 is a block diagram showing an embodiment of the target acquisition apparatus 10 having a laser beam source 12, an opto-mechanical adjusting or tracking device 14 associated with the laser beam source 12, an AGC (Automatic Gain Control) 16 connected to the opto-mechanical tracking device 14, an electrical evaluation device 18 which is connected together with the AGC 16, and a drive device 20 which is operatively connected to ta laser beam deflection device 22 of the opto-mechanical tracking device 14.

$$\Delta X = \frac{E2 + E3 - E1 - E4}{E1 + E2 + E3 + E4}$$

The opto-mechanical tracking device 14 has a coupling-in mirror 24 which is associated with the laser beam source 12 and which is at a defined spacing from the laser beam deflection device 22 which is in the form of a tilting mirror 26, the mirror 24 being oriented in parallel relationship with the tilting mirror 26.

Reference numeral 28 denotes a glint of a target object.

The laser beam source 12 is formed by a pulse laser 30. The laser beam radiated from the pulse laser 30 first impinges on the stationarily disposed mirror 24 of the opto-mechanical tracking device 14 and is deflected y the mirror 24 to the tilting mirror 26 from where the pulsed laser beam is then directed towards the glint 28. The laser beam is reflected by the glint 28. The reflected laser beam impinges again on the tilting mirror 26 of the opto-mechanical tracking device 14, from where it is deflected towards a convergent lens means 34. The convergent lens means 34 causes the reflected laser beam to be focused on to a four-quadrant detector 36 of a receiver 38 of the opto-mechanical tracking device 14.

FIG. 2 shows a diagrammatic front view of the four-quadrant detector 36. As can be seen from FIG. 2 the four-quadrant detector 36 has four quadrant detectors E1, E2, E3 and E4. The four quadrant detectors E1 and E4 establish two orthogonal spatial direction coordinates x and y. Each quadrant detector E1, E2, E3 and E4 has an output 40 to which a pre-amplifier 42 of constant gain is connected. The pre-amplifier 42 has outputs 44 which are connected together with inputs 46 of the AGC 16.

The electronic evaluation device 18 has switches S1, S2, S3 and S4 which are provided for suitable signals of the AGC 16, as will be described hereinafter. The electronic evaluation device 18 also has an adding and dividing circuit 48 and a regulator 50. The regulator 50 which is preferably formed by a PID-regulator, which is essentially a compensated proportional action governor with superimposed time-dependent differential behavior, has outputs 52 and 54 which are connected together with the drive device 20 for defined adjustment of the tilting mirror 25 of the laser beam deflection device 22.

The mode of the operation of the target acquisition apparatus 10, that is to say the giant tracker, is as follows:

After the pulsed laser beam is emitted by the laser beam source 12 the pulsed laser beam is reflected at the glint 28 and directed to the four-quadrant detector 36. In accordance with the respective position of the glint 28 the reflected pulsed laser beam is focused on to at least one of the four quadrant detectors E1, E2, E3 or E4 respectively. The corresponding quadrant detector E1, E2, E3 or E4 respectively generates a detector signal which occurs at the corresponding output 40. In that situation the following applies in regard to the target deviation ΔX in the direction of the x-axis:

$$\Delta X = \frac{S2 + S3 - S1 - S4}{S1 + S2 + S3 + S4}$$

The following applies for the target deviation ΔY in the direction of the y-axis:

Where SN represents the detector signal from the detector quadrant EN.

$$\Delta Y = \frac{S1 + S2 - S3 - S4}{S1 + S2 + S3 + S4}$$

Again, where SN represents the detector signal from the detector quadrant EN.

On the basis of the deviation signals ascertained, which are amplified by means of the pre-amplifiers 42, wherein the appropriate calculations in accordance with ΔX and ΔY are effected by means of the adding and dividing circuit 48 of the electronic evaluation device 18, the tilting mirror 26 of the laser beam deflection device 22 is always moved by means of the drive device 20 in such a way that the return reflection of the pulsed laser beam from the glint 28 of the respective target is always at the center 56 (see FIG. 2) of the four-quadrant detector 36. For that purpose, the laser pulses received by the four-quadrant detector 36 are firstly converted in the receiver 38 into electrical signals which occur at the outputs 40 of the detector 36. Those electrical signals are amplified with the constant-gain pre-amplifier 42. The electrical signals which are amplified in that way are matched by the AGC 16 to the electronic evaluation device 18. That is necessary because the reception power can vary very greatly due to a varying distance between the target acquisition apparatus 10 and the glint 28 of a corresponding target and different reflection of back-scatter characteristics of possible targets. The AGC 16 must cover a wide gain range as the reception power varies with the fourth power of the said distance between the glint 28 and the target acquisition apparatus 10. Even if a part of that dynamic range can possibly be covered by other components such as for example an aperture control system, it is still nonetheless difficult to implement the necessary synchronism in respect of amplification of the output signals of the four-quadrant detectors E1 to E4, with different gain settings. Temperature influences and ageing drift of the constituent parts or components can also make themselves felt here.

Downstream of the AGC 16 the reception signals of the four-quadrant detectors E1 to E4 are evaluated. For that purpose for example the respective maximum of the amplitude of all four channels can be ascertained and subjected to further processing the adding and dividing circuit 48.

As already stated the target acquisition apparatus 10 operates with a pulsed laser beam source 12. By virtue thereof it is possible for the evaluation channels to be suitably exchanged between the laser pulses with the switches S1 to S4 of the electronic evaluation device 18 (see FIG. 1), wherein the switches S1 and S3 can invert or exchange the channels of the quadrant detectors E1 and E3 and the switches S2 and S4 can invert or exchange the evaluation channels of the quadrant detectors E2 and E4 so that all faults which can possibly occur due to the electronic evaluation device 18 are compensated.

The switches S1 to S4 therefore serve to interchange at each second pulse the outputs or channels of the diametrally oppositely disposed quadrant detectors E1 and E3, and E2 and E4 respectively. That provides that the ascertained deviations ΔX and ΔY are inverted, that is to say, negative deviations from positive deviations, and vice-versa. The ascertained deviations are corrected again by further electronic switches which alternately invert or do not invert the ascertained deviations ΔX and ΔY. That procedure, with relatively simple means, gives a precisely operating glint tracker enjoying an enhanced level of reliability of the electronic system, while the requirements in terms of the components of the apparatus 10 and adjustment of the electronic system are comparatively easily possible.

For better results, the switches S1 to S4 should be placed as close as possible to the four-quadrant detector. Because all fault switch are made by the electronic between the switches S1 to S4 and the further switches for invert or not invert the deviation signed are automatically corrected. It's difficult for the function of the electronic to connect the switches (Sl to S4 ) direct to the four-quadrant detector. So the switches should be placed between the pre-amplifier 42 and the AGC (Automatic Gain Control) 16.

For better results, the switches S1 to S4 should be placed as close as possible to the four-quadrant detector. Because all fault switch are made by the electronic—between the switches S1 to S4 and the further switches for invert or not invert the deviation signal—are automatically corrected. It's difficult for the function of the electronic to connect the switches (S1 to S4 ) direct to the four-quadrant detector. So the switches should be placed after the pre-amplifier.

What is claimed is:

1. A target acquisition apparatus (10) having a laser beam source (12) for occasioning a glint (28) on a sighted target and including an opto-mechanical glint reflex-tracking device (14) with a four-quadrant detector (36), detector elements (Ei; i=1, - - - 4) are connected to an adding and dividing circuit (48) for the delivering of deviation information for said tracking device (14); characterised in that diametrically oppositely located of said detector elements (Ei; i=1/3, 2/4) are cynically interchanged with each other through switches)Si; i=1/3, 2/4) in synchronism with the pulse laser beam source (12) during the supplying of the adding and dividing circuit (48) whereby said switches serve to interchange the outputs of detector elements of diametrically opposed quadrants of said four-quadrant detector in an electronic evaluation device (18), such that the output of the elements of one quadrant can be connected to processing circuitry of the corresponding diametrically opposed quadrant.

2. A target acquisition apparatus according to claim 1 characterised in that each quadrant detector (E1, E2, E3, E4) has an output (40) to which a pre-amplifier (42) is connected for amplification of the respective detector signals.

3. A target acquisition apparatus according to claim 2 characterised in that the pre-amplifiers (42) have a constant gain.

4. A target acquisition apparatus according to claim 1 characterised in that the laser beam source (12) is formed by a pulse laser (30) and that the outputs (44) of the pre-amplifiers (42) of the quadrant detectors (E1, E2, E3, E4) are connected together with an automatic gain control connected to the electronic evaluation device (18).

5. A target acquisition apparatus according to claim 1 characterised in that the electronic evaluation device (18) has an adding and dividing circuit (48) and a regulator (50).

6. A target acquisition apparatus according to claim 5 characterised in that the opto-mechanical tracking device (14) has a laser beam deflection device (22) which is connected to a drive device (20) and that the drive device (20) is connected together with the regulator (50) of the electronic evaluation device (18).

7. A target acquisition apparatus according to claim 5 characterised in that the regulator (50) is in the form of a PID-regulator.

* * * * *